(12) United States Patent
Efthymiou et al.

(10) Patent No.: US 8,719,429 B2
(45) Date of Patent: May 6, 2014

(54) COMMUNICATIONS SYSTEM

(75) Inventors: Costas Efthymiou, Bristol (GB); Georgios Kalogridis, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 19 days.

(21) Appl. No.: 13/085,758

(22) Filed: Apr. 13, 2011

(65) Prior Publication Data

US 2011/0258319 A1 Oct. 20, 2011

(30) Foreign Application Priority Data

Apr. 16, 2010 (GB) .................................. 1006432.7

(51) Int. Cl.
*G06F 15/16* (2006.01)

(52) U.S. Cl.
USPC ........... 709/228; 709/227; 709/249; 709/250; 709/226; 709/239

(58) Field of Classification Search
USPC ................................. 709/227–228, 249–250
See application file for complete search history.

(56) References Cited

U.S. PATENT DOCUMENTS

| | | | | |
|---|---|---|---|---|
| 6,633,761 | B1 * | 10/2003 | Singhal et al. | 455/436 |
| 6,891,943 | B1 * | 5/2005 | Liebl | 379/219 |
| 7,356,137 | B1 * | 4/2008 | Burg et al. | 379/211.01 |
| 7,844,278 | B1 * | 11/2010 | Ross et al. | 455/452.1 |
| 2002/0146011 | A1 * | 10/2002 | Stern | 370/395.2 |
| 2003/0229595 | A1 * | 12/2003 | Mononen et al. | 705/63 |
| 2006/0126503 | A1 * | 6/2006 | Huck et al. | 370/225 |
| 2006/0268767 | A1 | 11/2006 | Sato et al. | |
| 2007/0213048 | A1 * | 9/2007 | Trauberg | 455/432.3 |
| 2008/0090520 | A1 * | 4/2008 | Camp et al. | 455/41.2 |
| 2009/0067368 | A1 | 3/2009 | McAndrews et al. | |
| 2009/0144390 | A1 * | 6/2009 | Previdi et al. | 709/217 |

FOREIGN PATENT DOCUMENTS

| | | |
|---|---|---|
| EP | 1 806 905 A1 | 7/2007 |
| EP | 2 160 058 A1 | 3/2010 |
| JP | 2003-309874 | 10/2003 |
| JP | 2006-506880 | 2/2006 |
| JP | 2007-507180 | 3/2007 |
| WO | WO 2009/031659 A1 | 3/2009 |

OTHER PUBLICATIONS

Office Action issued Sep. 18, 2012 in Japanese Patent Application No. 2011-090838 (with English translation).
Combined Search and Examination Report issued in related British application No. GB 1006432.7 dated Aug. 16, 2010.
Examination Report issued in GB 1006432.7, Aug. 7, 2012.

* cited by examiner

*Primary Examiner* — Abdullahi Salad
(74) *Attorney, Agent, or Firm* — Oblon, Spivak, McClelland, Maier & Neustadt, L.L.P.

(57) ABSTRACT

The present invention relates to a method and apparatus for optimising a communications network (101) comprising a plurality of heterogeneous network resources. The method comprises receiving a communication request from a device (106a, 106b, 105, 107a, 107b) for setting up a communication through one of a plurality of heterogeneous network resources; selecting, in accordance with at least one communication characteristic, a network resource of the plurality of network resources through which the communication is to be set-up; and establishing the communication through the selected network resource.

14 Claims, 5 Drawing Sheets

COMMUNICATIONS SYSTEM

FIELD

Embodiments described herein relate to an apparatus and method for optimising a communications network comprising a plurality of heterogeneous network resources.

BACKGROUND

Communications networks are found in most urban environments nowadays and form an important part of every day life in the western world. One of the most commonly used communications networks is the Internet. The Internet is available through various different network resources such as a wired Internet connection, which may take the form of an Ethernet based local area network (LAN), a wireless local area network (WLAN), and through a cellular network via mobile devices such as mobile phones. In this context, network resources are connectivity options that a mobile device may have when searching for an Internet connection. Given that todays' mobile devices are equipped with multiple wireless interfaces (e.g. WLAN, Bluetooth, GPRS, UMTS, etc.), there are many options. An alternative term for these network resources, when used in a mobile/wireless context, are RATs or Radio Access Technologies. In addition to the Internet, internal communications within a company or a home may be provided via an intranet, which may use wired Ethernet or WLAN-based systems. These include, but are not limited to, IEEE 802.11a/b/g/n (WiFi variants), Zigbee, Bluetooth or any other present and future wireless local area networking standards. Other common communications networks include the PSTN wired telephone network, which is slowly becoming less popular in the western world, in addition to cellular based communications networks, which, in contrast, are continually growing in popularity across the globe.

LANs are communications networks which cover small geographic areas, and provide allow for both internal communications between users of the LAN in addition to providing a connection to external networks such as the Internet. Such networks are integral to large scale networking communications because they reduce the overall traffic flow over wide area networks (WANs) when only short range communications are being made.

Generally, LANs and WLANs are provided in buildings such as offices and homes, however, increasingly such networks are being found in other public spaces, being provided in both inside and outside environments. In particular, WLANs are becoming more commonly used in outside public spaces to allow for users of the Internet to roam using a WLAN connection.

Wireless communication has many advantages over the traditional wired based communications in that it allows for users to access network resources away from wired connection points, as well as allowing users to move around while communicating through the network resource. In addition to this, laptop computers, mobile phones, and other wireless communications devices with WLAN connectivity capabilities are becoming ever more popular. This is partly due to the improved level of service provided by these devices, but also due to recent reductions in prices.

The increase in the popularity of electronic devices utilising wireless network resources such as WLAN connectivity is placing increasing demands on the bandwidth requirements and performance capabilities of WLANs. It is therefore common for users of WLANs, whether it be in the home, office, or any other environment, to experience reductions in communication speed, and possibly even communication failure when a particular WLAN is in high demand. Such reductions in speed and possible failures in the network connection are extremely undesirable. This is particularly pertinent for users of real-time communications such as multimedia streaming, IPTV or video communications.

The usual approach taken within IP-based communications is that of 'best effort' traffic delivery, which treats each data packet as equal in priority and attempts to serve all streams equally. In recent years, a number of methods have been employed that offer a degree of Quality of Service (QoS), usually by assigning different priority levels to data packets based on their class of application. This involves attempting to provide slower services for non-real-time data streams, to ensure that those needing real-time data streams are less disturbed by the lack of available bandwidth. However, such methods are still limited by the available bandwidth and consequently the above-mentioned problem is only reduced slightly. Although improvements can be seen in situations where real-time (RT) and non-real-time (NRT) traffic is mixed, a LAN trying to service a number of RT streams will struggle when the available bandwidth is not adequate for all of them. Setting each stream to the same (high) priority will still result in dropouts and loss of service.

BRIEF DESCRIPTION OF THE DRAWINGS

Embodiments shall hereinafter be described, as an example only, with reference to the following drawings.

DETAILED DESCRIPTION

Certain embodiments described herein provide an apparatus and method for selecting a network resource and setting up a corresponding communication through the selected network resource of the plurality of available network resources when a request for a new communication is made.

Embodiments described herein relate to a method for optimising a communications network. In particular, embodiments relate to optimisation of a home communications network including various types of network resource. Such optimisation is achieved by maximising the utilisation of each of the available network resources, thereby minimising the strain on any one network resource.

In home networks WLANs are commonly preferred network resources through which devices will automatically attempt to connect to the home network. In certain embodiments described herein, a determination is made as to whether it is possible to connect via the WLAN. In performing this determination the current usage of the WLAN is taken into account. Also, the requirements of the device making the communication session request may also be taken into consideration. Furthermore, statistical analysis of network usage may be considered in order to determine whether it is suitable to set up the new communication session via the WLAN.

In the event that it is determined unsuitable to set up the communication session via the WLAN, certain embodiments described herein will attempt to find an alternative network resource through which the communications session can be established. For wireless communications devices this will depend whether the wireless device making the request can communicate using any other wireless communication protocols. Such protocols could include short range protocols such as Bluetooth, or even cellular based communications. If the device is capable of utilising one of these alternative wireless communications types, it will be determined whether there is any way of providing a communications session via one of these communications types. For short range wireless communications it will need to be determined if there is another device connected to the home network that can provide a short range wireless connection, such that the device making the request can connect via the other device. If such a network resource is available the connection will be set up via this network resource.

Hence, embodiments described herein relate to utilising available resources within a network, and even utilising resources provided by devices connected to the network, in order to optimise network performance. Reductions in speed for existing users are mitigated by providing such alternative routing.

In alternative embodiments the network is optimised by determining the best routing of a communication request for a device upon initial request. The best routing is determined based on the available network resources, their current usage and the requirements of the communication request. In particular, in such embodiments even if a network which is indicated by the device as being preferable is available it may be determined that a better connection can be established by providing alternative network routing. Hence, the present invention provides an intelligent internal network routing system for network optimisation.

One embodiment provides a method for optimising a communications network comprising a plurality of heterogeneous network resources, the method comprising receiving a communication request from a device for setting up a communication through one of a plurality of heterogeneous network resources; selecting, in accordance with at least one communication characteristic, a network resource of the plurality of network resources through which the communication is to be set-up; and establishing the communication through the selected network resource.

The step of selecting can further comprise determining a network resource of the plurality of network resources which is preferable for use by the device; and determining whether to set-up the communication through the preferred network resource in accordance with the at least one communication characteristic.

The step of selecting can comprise determining an alternative network resource to set up the communication through when a determination is made not to set-up the communication through the preferred network resource.

Setting up the communication through the alternative network resource can involve providing the communication through a wired network resource to a further device, and a short range wireless link between the further device and the device.

The at least one communication characteristic can comprise a communication characteristic associated with the device.

The communication request can include information relating to the communication characteristic associated with the device.

The information relating to the communication characteristic associated with the device can include an identification of the type of communications session to be set up.

The information identifying the type of communication session to be set up can include information relating to bandwidth requirements of the type of communications session.

The information identifying the type of communication session to be set up can include information relating to minimum delay requirements of the type of communications session.

The method can further comprise determining bandwidth requirements associated with the type of communications session.

The method can further comprise determining minimum delay requirements associated with the type of communications session.

The information relating to the communication characteristic associated with the device can include identification of the physical location of the device.

The information relating to the communication characteristic associated with the device can include identification of the preferred network resource of the plurality of network resources.

A network resource of the plurality of network resources, via which the communication request is received, can be the preferred network resource of the device.

The at least one communication characteristic can comprise a communication characteristic associated with at least one of the plurality of network resources.

The communication characteristic can comprise information relating to a bandwidth usage of the at least one of the plurality of network resources.

The at least one communication characteristic can comprise information identifying the network resources of the plurality of network resources supported by each device associated with the network.

The method can further comprise rerouting one or more current communications using the selected resource.

Another embodiment provides an apparatus for optimising a communications network comprising a plurality of heterogeneous network resources, the apparatus comprising an input arranged to receive a communication request from a device for setting up a communication through one of a plurality of heterogeneous network resources; and a processor arranged to: select, in accordance with at least one communication characteristic, a network resource of the plurality of network resources through which the communication is to be set-up; and establish the communication through the selected network resource.

When selecting a network resource, the processor can be further arranged to: determine a network resource of the plurality of network resources which is preferable for use by the device; and to determine whether to set-up the communication through the preferred network resource in accordance with the at least one communication characteristic.

When selecting a network resource, the processor can be further arranged to determine an alternative network resource to set up the communication through when a determination is made not to set-up the communication through the preferred network resource.

The processor may be arranged to set up the communication through the alternative network resource by providing the communication through a wired network resource to a further device, and a short range wireless link between the further device and the device.

The at least one communication characteristic can comprise a communication characteristic associated with the device.

The communication request can include information relating to the communication characteristic associated with the device.

The information relating to the communication characteristic associated with the device can include an identification of the type of communications session to be set up.

The information identifying the type of communication session to be set up can include information relating to bandwidth requirements of the type of communications session.

The information identifying the type of communication session to be set up can include information relating to minimum delay requirements of the type of communications session.

The processor can be further arranged to determine bandwidth requirements associated with the type of communications session.

The processor can be further arranged to determine minimum delay requirements associated with the type of communications session.

The information relating to the communication characteristic associated with the device can include identification of the physical location of the device.

The information relating to the communication characteristic associated with the device can include identification of the preferred network resource of the plurality of network resources.

A network resource of the plurality of network resources, via which the communication request is received, may be the preferred network resource of the device.

The at least one communication characteristic may comprise a communication characteristic associated with at least one of the plurality of network resources.

The communication characteristic can comprise information relating to a bandwidth usage of the at least one of the plurality of network resources.

The at least one communication characteristic can comprise information identifying the network resources of the plurality of network resources supported by each device associated with the network.

The processor can be further arranged to reroute one or more current communications using the selected resource.

The network may be a WLAN.

The alternative network resource may involve providing the communication through a further device.

The communication may be set-up through the further device when it is determined, from the at least one communication characteristic, that: the device and the further device are both provided with a short range wireless communication capability, and are within sufficient range to utilise the short range wireless communication capability; and the further device is provided with a wired network resource.

The at least one communication characteristic may comprise information relating to a bandwidth usage of each of the plurality of network resources.

The at least one communication characteristic may comprise information indicating a location of each device associated with the network.

Embodiments optimise the use of network resources and consequently improve the performance of each associated network resource. This is achieved in at least one embodiment by selecting an appropriate network resource for a new communication session. Such a selection may take into account current usage of preferred network resources, therefore, minimising the disruption to current communications that are taking place.

Embodiments minimise disruption to current users of network resources thereby mitigating loss in session quality. This is achieved in at least one embodiment by routing new communications via available network resources having sufficient bandwidth available to support the communication.

Another potential advantage is that of better energy management of the mobile devices in question. If a suitable low-range, low-energy communications resource can be used instead of the main WLAN, a lower power draw may result, depending on the type of communications resource used.

Throughout this specification like reference numerals refer to like parts.

Embodiments described herein concern the management of communication requests within a communications network. In particular, certain embodiments provide a system that optimises the use of the resources available within the managed communications network in order to minimise disruption to existing users of the network.

The embodiments described below concentrate upon implementation within the home environment, and with respect to home wireless network management. However, it will be appreciated that embodiments are equally applicable in alternative settings such as offices, industrial buildings, any suitable inside or outside public space, or any other environment having an integrated communications network. Furthermore, while the embodiments described below relate specifically to a LAN, the underlying concepts could be utilised within a larger communications network.

It is common for home communications networks to be based around a wireless networking system, for example a WLAN. Many electronic devices that are used within the home, such as desktop computers, laptop computers, printers, scanners, MFPs, mobile phones, PDAs, televisions, set-top boxes, and multimedia players are provided with multiple means of communication, which often includes WLAN connection capabilities. In addition to WLAN connection many electronic devices are also capable of communicating over one or more of the following types of network resource: wired Internet connection, Bluetooth, femto cell resources, Zigbee, etc., UWB and 60 GHz capabilities. It is noted that this list is not exhaustive and could incorporate other wireless technologies in the future. It is also noted that while femto cell resources are generally seen as separate networks in themselves, it should be appreciated that femto resources could be utilised as part of a local communications network. For example, one or more local femto base stations could provide free communications for devices communicating with each other within that local area.

A first embodiment will now be described specifically with reference to FIGS. 1 to 3. This embodiment aims to maximise the use of the available network resources in order to optimise the performance of the home wireless network. Hence, this embodiment relates to optimisation of network resources in a heterogeneous network; that is, a network that provides a plurality of separate network resources or means of connection. Such a heterogeneous network may include both wired connections, and a plurality of wireless connections as discussed above.

Figure 1:
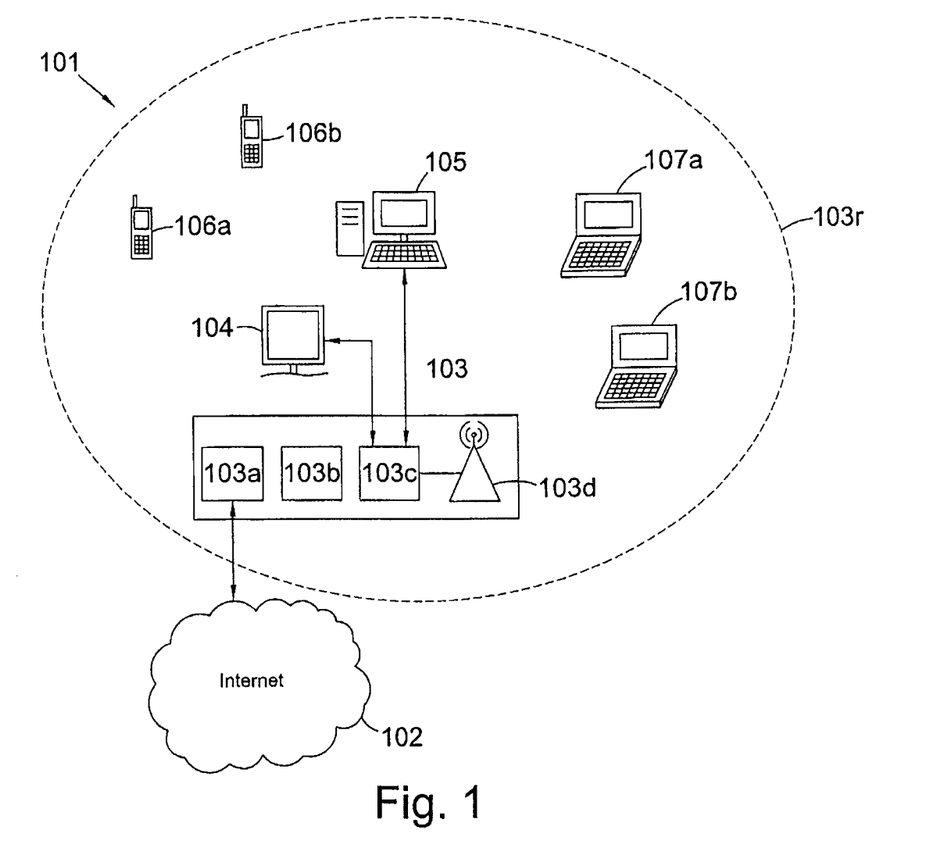
FIG. 1 provides a schematic illustration of a home network in accordance with a described embodiment.

FIG. 1 provides a schematic illustration of a home network in accordance with a first embodiment.

A home network 101 is connected to the Internet 102 via a gateway 103. The gateway 103 provides a portal through which devices within a home such as a television 104, a desktop computer 105, mobile phones 106a, 106b and laptop computers 107a, 107b can connect to the Internet. Furthermore, the gateway 103 acts as a hub through which internal communications between devices connection to the network can communicate with one another.

The gateway includes a modem 103a, a router 103b, an internal network controller 103c, and a WLAN Access Point 103d. In this embodiment of the invention these are modular components of a single unit. However, it will be appreciated that each of these components could be provided as separate units, or alternatively each of these components could be integrated into a single processing unit.

In this embodiment the modem 103a, router 103b and WLAN access point 103d are provided in accordance with similar known systems such as integrated ADSL modem/switch/wireless access point. In particular, the modem is directly connected to an Internet connection and provides the standard modulation/demodulation functionality of a modem. The router 103b is connected to the modem and provides routing information for outgoing information to be sent from the modem over the Internet. The internal network controller 103c provides a connection point between the router 103b and a plurality of network resources. In particular, the network switching arrangement 103c effectively switches communications from the router across the various network resources.

In FIG. 1, the network resources illustrated include direct cable connections to the television 104 and the desktop computer 105, in addition to a WLAN connection provided by the WLAN Access Point 103d. The WLAN access point 103d provides a wireless connection to any devices within its wireless range 103r. Hence, in FIG. 1 the mobile phones 106a and 106b, in addition to the laptop computers 107a and 107b are able to connect to the Internet through the WLAN access point 103d. Those devices that are connected to the gateway 103 via a wired connection may also have the capability to connect to the gateway wirelessly through the WLAN access point 103d.

In addition to providing network resources through the WLAN access point 103d, and the wired connections, embodiments, including this embodiment, allow for wireless devices to connect to the gateway 103 via short range wireless communication with a device connected via a wired network resource. Such short range wireless communications include Bluetooth, UWB and 60 GHz or any other short-range wireless technology.

Figure 2:
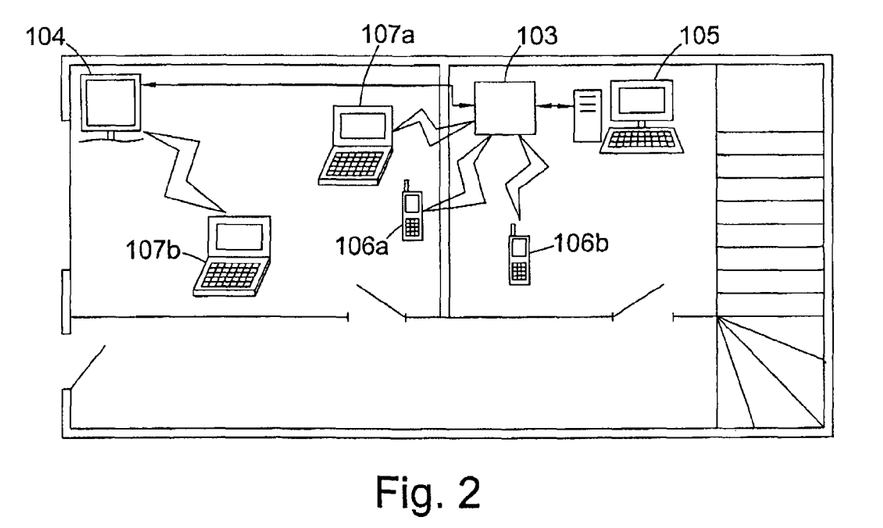
FIG. 2 provides a further schematic illustration of a home network in accordance with a described embodiment.

This alternative network resource is illustrated in FIG. 2. In particular, FIG. 2 illustrates the network of FIG. 1, but with each device located around various rooms of a house.

Both the desktop computer and television in FIG. 2 are capable of communicating using Bluetooth. Bluetooth is commonly provided on such devices to enable other devices that may be integrated into the network such as DVD players and printers to communicate wirelessly and directly with the desktop computer and television respectively. This allows, for example, for the desktop computer to communicate with a printer without having to route the communication through the gateway. In this embodiment, such Bluetooth functionality is also utilised in order to allow for a further network resource to be provided.

As shown in FIG. 2, if laptop computer 107a and mobile phones 106a, 106b are communicating through gateway 103 wireless, via the WLAN access point 103d, and if it is determined that there is insufficient bandwidth available through the WLAN access point 103d to support a communications session requested by the laptop computer 107b, an attempt is made to utilise an alternative network resource. Firstly, the location of the laptop computer 107b is determined, and it is then determined whether there are any known alternative routing systems, such as short range wireless connections. In FIG. 2, it can be seen that laptop computer 107b is provided in the same room as the television 104. The television 104 has a wired connection to the gateway 103, and also has Bluetooth functionality. Consequently, an alternative network resource is set-up to allow the laptop computer 107b to connect to the network via the television 104, thereby bypassing the WLAN access point 103d. No additional demand is, therefore, placed on the WLAN access point and the existing communications session can continue without disturbance or loss of session quality. This approach is considered valid when the bottleneck, i.e. the limitation that causes loss of session quality, is the WLAN and not the Internet connection itself. If the Internet connection itself is the limiting factor, i.e. it is saturated, then following the method disclosed herein is unlikely to yield any improvement.

The means by which this first described embodiment provides alternative network resources shall now be described in more detail with reference to FIG. 3.

Figure 3:
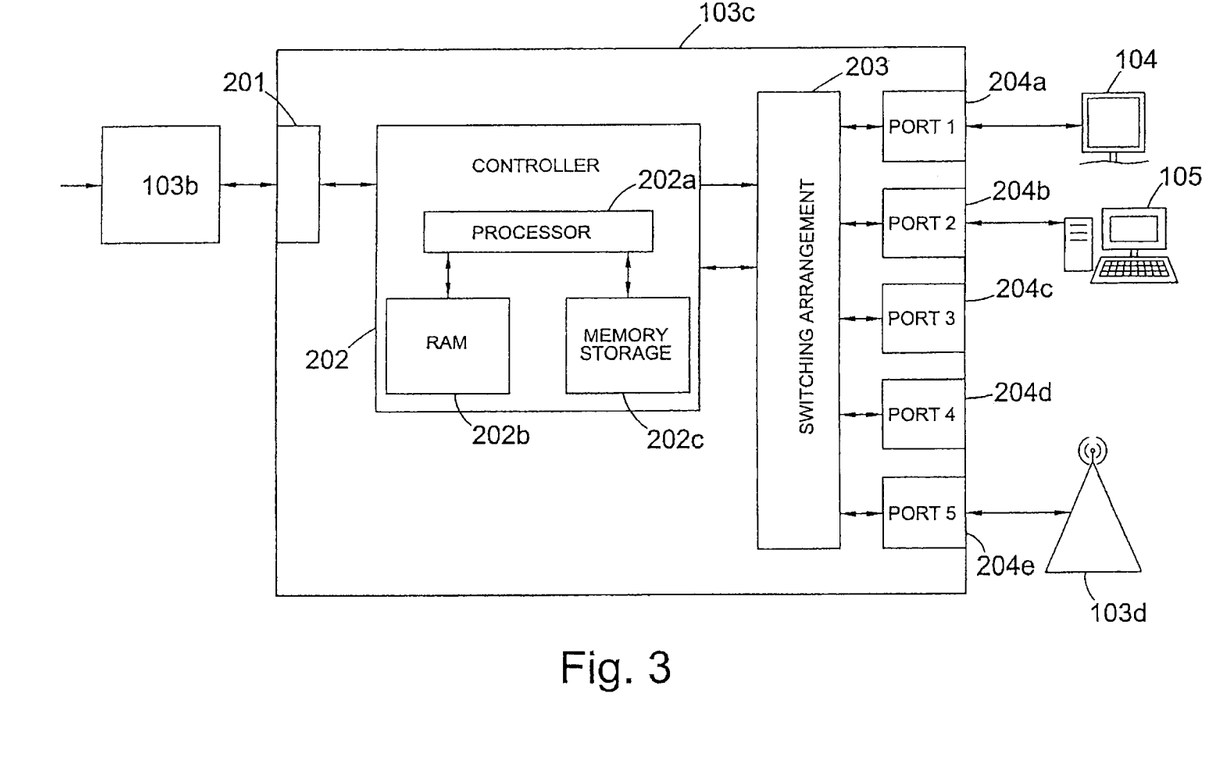
FIG. 3 provides an illustration of the functional components of an internal network controller.

FIG. 3 provides a detailed illustration of the functional components of the internal network controller 103c. The internal network controller 103c is the component of this embodiment that enables for the advantages, such as network optimisation, to be achieved. In particular, the internal network controller 103c provides an internal routing functionality whereby communications passing through the gateway 103 are routed through one of the network resources provided. Furthermore, the internal network controller 103c provides network monitoring functionality, which allows it to intelligently set-up communications through a network resource that results in the best connectivity for that communication, while also minimising any possible reduction in communication quality for other communications taking place. Hence, the internal network controller 103c allows for the home network of the present invention to be a managed communications environment.

The internal network controller 103c is connected to the router 103b via an input port 201. Data passes to and from the input port 201 via the controller 202. The controller is the main processing unit for the internal network controller 103c and in this embodiment includes, input port, a processor 202a, RAM 202b, and memory storage 202e. The RAM is provided to assist the operational functionality of the processor, while the memory storage 202c is provided as a main memory for storage of information such as network communication characteristics.

The controller then controls a switching arrangement 203, which effectively acts as an internal network routing means. The switching arrangement 203 is connected to a plurality of internal network ports 204a, 204b, 204c, 204d, and 204e. Each of these ports is provided to connect to a particular network resource. For example, FIG. 3 shows port 1 204a and port 2 204b providing wired network resources (e.g. Ethernet) and being connected to the television 104 and desktop computer 105 respectively. Port 3 204c and port 4 204d are unused, while port 5 204e is connected to the WLAN access point 103d. Hence, in accordance with instructions received from the controller 202 in the form of internal control signals, the switching arrangement 203 is able to route communications data to a particular port 204a, 204b, 204c, 204d, 204e such that a particular network resource is used for a communication stream.

It will be appreciated that while five communications ports are illustrated, the number of ports is not restricted to this number. Furthermore, the ports may allow for connection via network resources other than a wired connection and a WLAN connection. For example, a port could be provided that allows for femto cell connectivity via a wired or wireless connection (i.e. from the network controller 103c to the femto-cell device), or a direct short range wireless connection could be provided by the internal network controller 103c itself.

In order to allow for the internal network controller 103c to set-up alternative network resources, it is necessary for the internal network controller 103c to collect information regarding the network. Furthermore, collecting such information allows the internal network controller 103c to determine when it is necessary to set up the alternative network resource. Such data collection shall now be described.

Wireless devices are becoming ever more common, particularly for home use. Hence, in the home network the gateway is likely to receive many communication request from wireless devices, and it is the network resource provided by the WLAN access point that is most likely to become saturated or overloaded such that there is insufficient bandwidth available to set-up further communications.

In order to determine whether a request to set-up a further communication via the WLAN is possible, it is necessary to determine whether the WLAN has sufficient available bandwidth. Consequently, the internal network controller 103c needs to monitor the current usage of the WLAN access point. This current usage may relate to the current use of the available bandwidth.

In addition to monitoring the current bandwidth of each network resource it is advantageous to monitor session characteristics of each communications session. In particular, keeping a record of characteristics such as the average bit rate usage, minimum delay requirements, and quality of service requirements for different types of communication will assist the internal network controller 103c in determining whether there are sufficient resources for setting up a further communication.

Gathering session characteristics is important because it can influence whether it is possible to set-up a new communication or not. For example, it may make little difference to a non-streaming communication, such as web-browsing, if the bit-rate is slowed slightly to allow for an additional communication to be set-up through the same network resource. However, for a live data stream, a slight reduction in the bandwidth being used by that communication could cause major changes to the quality of the data stream.

Alternatively, rather than merely determining the bit rate usage and delay requirements, the internal network controller 103c can just determine whether each communication session is a real-time (RT) data stream, such as IPTV, gaming, or other multimedia functionalities, or a non-real-time (NRT) communication, such as web-browsing or instant messaging. From this information, the internal network controller 103c is able to determine whether there is sufficient bandwidth available based on known usage characteristics associated with those types of communication. These usage characteristics may be based upon statistical information gathered from previous communications sessions, or from pre-set information supplied by the application in question.

In this embodiment, the bandwidth usage of all available network resources is monitored. However, since it is generally only the WLAN access point which supplies multiple devices with a network resource, it would be possible in alternative embodiments for the internal network controller 103c to assume that the other network resources have sufficient available bandwidth, and thus not monitor these resources.

The memory storage 202c can store information such as the bandwidth available for each standard network resource, in addition to the current usage of the network resource. The memory storage 202c includes a database storing information relating to bandwidth usage and session characteristics. Hence, this database can be used as a reference means to help the internal network controller 103c to determine whether there is sufficient bandwidth for a new communication to be set-up. In addition to simply storing the session characteristics, the internal network controller 103c can generate statistics based upon this information. These statistics are then stored in memory and can help provide even more intelligent determinations regarding the available resources of a network resource, while also allowing an alternative, and arguably simpler determination process, as mentioned above.

The network controller 103c is able to monitor network usage using techniques such wireless beacon monitoring or active measurement techniques relying on probing. Wireless beacons are periodically transmitted which can be a useful gauge of how loaded a network is. For example, a beacon is normally transmitted every 100 ms, but when a wireless access point is overloaded, the average time between beacons can be significantly higher than this. Active measurement techniques which rely on probing, i.e. sending a large amount of data to a wireless access point and measuring the time it takes to complete, could be utilised but they are known to be detrimental to the performance of the wireless network as a whole, due to the extra traffic that they introduce into the network.

It is worth noting that the bandwidth capacities of WLANs are constantly variable, as they depend on the wireless mode being used (802.11a/b/g/n, etc.), the number of devices on the network, the applications they are running, and the devices distance from the wireless access point, etc. Hence, such constant monitoring of the bandwidth capacity of the WLAN is required.

In addition to obtaining information relating to current data sessions, the internal network controller 103c also obtains information relating to the type of communication when a new communication is to be set-up. It may be that a communication request can include this information within the request, alternatively, the internal network controller 103c could request this information. This is important in order to allow the internal network controller 103c to determine how much bandwidth will be needed for the new communication, and consequently determine whether there is sufficient bandwidth.

In order to provide alternative network resources, the internal network controller 103c also collects information relating to the other available communication mediums provided by each device, in particular, by the fixed devices connected via the wired network resources. Such available communication mediums include short range wireless communications such as Bluetooth, UWB, and 60 GHz, in addition to femto cell based communications. This information enables the internal network controller 103c to determine what, if any, alternative network resources are available. Such information may be requested from each device the first time the device connects with the internal network controller 103c. Alternatively, the information could be embedded within a set-up communication that is sent from the device to the internal network controller 103c.

Once the internal network controller 103c knows theoretically whether there are alternative network resources available, i.e. whether a fixed device offers an alternative communication medium, such as Bluetooth, which is also provided on the device, the internal network controller 103c also needs to determine whether such a network resource will be functional in practice. In order to achieve this, the internal network controller 103c collects and stores information regarding the physical positions of each device, both wired and wireless. With respect to the wireless devices periodic updates of each devices location will be required. This could be achieved by receiving periodic updates from the wireless devices. Obtaining this information allows the internal network controller 103c to determine whether, for example, the device setting up the communication and the fixed device through which the network resource will be routed are within sufficient range of one another to utilise a particular communication medium, such as Bluetooth.

Such positioning information could be obtained through the deployment of a separate location system, such as an indoor UWB positioning system, which acts as a kind of indoor GPS-like system. Alternatively an assisted-GPS system could be utilised. Such functionality can be embedded into devices with GPS functionality. These techniques rely on timely and accurate ephemeris data regarding the position of GPS satellites in the sky, so that the extremely weak signals can be accurately tracked. Thus, a form of indoor GPS can be supplied.

In alternative embodiments, rather than storing positional information, an attempt to set-up the communication using the selected communication medium is made if the devices are determined to be sufficiently close. If there is a wall or such like which reduces the signal level then the communication will not be set-up and the internal network controller 103c will determine an alternative network resource to use. Such an embodiment simplifies the process because the positional determination steps are not required.

While the above described embodiment generally requires a large amount of information to be collected in order to determine whether there is sufficient bandwidth, and if there is a suitable alternative network resource, it will be appreciated that alternative embodiments may collect a reduced amount of information. In such alternative embodiments approximations are made, based on the available information as to whether a preferred network resource, such as the WLAN, can support a new connection and, if it is determined that it cannot be supported, a further approximation is made in order to determine the best alternative network resource.

Such approximations are made by only collecting a reduced amount of information. For example, when making the determination in respect of available bandwidth, the system could merely determine the current bandwidth usage, and not collect information relating to the type of session in progress. While such embodiments reduce the likelihood of accurate determinations, they do increase the speed of operation of the internal network controller 103c and reduce the processing power required by the internal network controller 103c.

While the above embodiment mainly considers alternative routing via a fixed device having short-range wireless communication capabilities, it will be appreciated that various alternative routing schemes could be used. For example, an alternative wireless network, such as a femto cell based communication could be utilised. Furthermore, more than one network resource could be used in order to route a communication without placing undue burden on a laden network resource.

Figure 4:
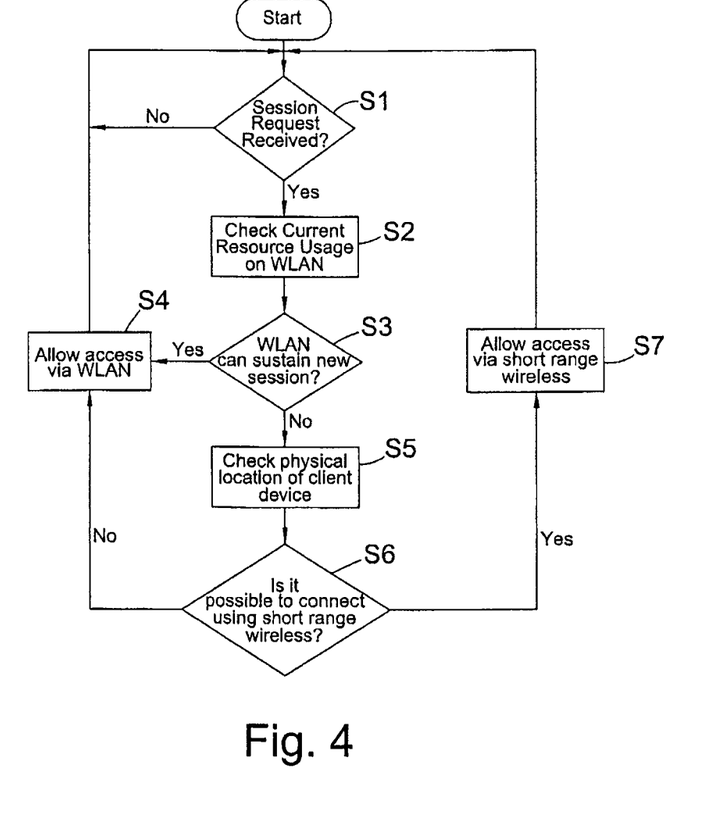
FIG. 4 illustrates a flow chart of the operation of a described embodiment.

The operation of this first embodiment will now be discussed with reference to FIG. 4. Firstly, a device, for example laptop computer 107b, makes a session request at step S1. In this embodiment, the session request involves sending out a communication session request message over a preferred network resource, which in the case of the laptop computer 107b is the WLAN. Hence, the session request S1 is a WLAN communication. This session request S1 may include information identifying the device, identifying the location of the device, and identifying the communication type that the device would like to set-up, including required QoS parameters such as average bitrate, tolerable delay/jitter, RT/NRT, etc.

In alternative embodiments, the session request merely specifies that there is an intent to set-up a communications session and, once the request is received, for example, by the WLAN access point 103d, further communications take place in order to determine this further information.

Since the session request is sent out using a communication protocol readable by the WLAN access point 103d, the WLAN access point is able to receive the session request. Rather than setting up a communication in response to this request, the WLAN access point 103d sends the session request on to the internal network controller 103c.

The internal network controller 103c then checks current resource usage on the WLAN at step S2. Hence, at this point in time the internal network controller 103c already knows the current usage of the WLAN because it has been continually gathering such information, as discussed previously. Consequently, the internal network controller 103c is able to determine, based on the available WLAN bandwidth and the type of communication to be set-up, whether there is sufficient bandwidth to set-up the communication. This determination step is shown as step S3 in FIG. 4. If there is sufficient bandwidth the communication is set up over the WLAN in accordance with step S4. If there is not sufficient available bandwidth then step S5 is performed.

It is noted that in addition to determining whether the WLAN can be used based on the available bandwidth, the determination can also take in account information about the sessions currently in progress. For example, the determination may take into account the type of sessions in progress, i.e. whether or not each of the session is streaming multimedia data.

It is noted that in alternative embodiments the WLAN access point 103c is provided with the processing functionality and memory resources to carry out steps S2 and S3. This, therefore, reduces the requirement for information to keep being passed on to the internal network controller 103c. However, centralization of all processing functionality provides a more streamlined processing means. Hence, performing all the processing within the internal network controller 103c is generally preferable.

The internal network controller 103c then checks the physical location of the device making the session request. This is shown as step S5 of FIG. 4. This location may already be stored in memory having been provided as part of the session request. Alternatively, a request for the current location of the device may be sent to the device from the internal network controller 103c via the WLAN.

At step S5 it also needs to be determine whether the device has any other wireless communication protocols that it is able to use, for example Bluetooth, and whether or not the other wireless communication protocols can sustain the session request. This information may already be stored in the memory of the internal network controller 103c, sent as part of the session request, or determined via some subsequent communication between the device and the internal network controller 103c.

Once the location of the device is determined at step S5, step S6 is carried out and it is also determined whether there are any other devices in the same room with short-range wireless communication capabilities. Obviously, it will be appreciated that in alternative embodiments, step S6 may involve determining if there are any other communication mediums available. Furthermore, step S6 could involve merely involve either the device, or fixed devices connected via a wired connection, sending out a communication request message via a communication medium such as Bluetooth. The device that sends the message will then await a response, and if a response is received the communication session will be set-up through this alternative network resource.

In any case, if it is determined that it is not possible to set-up an alternative network resource, then step S4 is returned to and a communication through the WLAN is set-up. Given that it has already been determined that there is insufficient available bandwidth, compromises will have to be made in respect of communication session speed. This could be achieved in different ways. For example, it may be decided by the internal network controller 103c that all non-live data communications can receive a reduced bandwidth, thereby allowing the live streamed data to continue with its current streaming quality. However, it will be appreciated that alternative means for managing the WLANs resources could be utilised.

In alternative embodiments, the session request could be rejected in order to preserve a high quality service for all connected device at all times.

If an alternative network resource is available, for example through a short-range wireless connection then at step S7 the communication is set up through the determined alternative network resource.

In alternative embodiments, further steps are included within the procedure which involves determining whether the alternative network resource is capable of supporting the communication, for example, to see if sufficient bandwidth is available. However, in the above-described preferred embodiment, it is assumed that there will not be such problems through such an alternative network resource.

In summary, the internal network controller 103c determines which network resource to utilise for a session request based primarily on two pieces of information:
(a) requested session characteristics, i.e. information regarding the session that is to be set up and/or information regarding the sessions that are already taking place; and
(b) device location and communication capabilities, i.e. the location of both the wireless device and the location of fixed point devices, in addition to the communication capabilities, such as short range wireless communication capabilities, of each of these devices.

In an alternative embodiment, the internal network controller 103c is arranged to provide a network redirection or rerouting service in order to further optimise the performance of a network. This embodiment is discussed with reference to FIG. 5.

Figure 5:
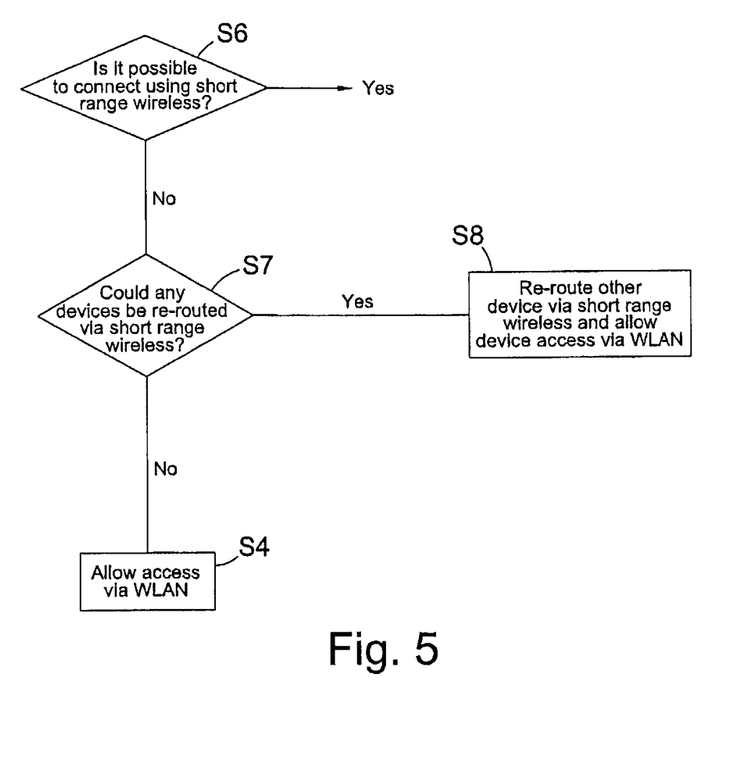
FIG. 5, illustrates a flow chart of the operation of a described embodiment involving communication resource rerouting.

In FIG. 5, the further process of current communication resource redirection is illustrated. It will be seen that the steps shown in FIG. 5 relate to those of FIG. 4. In particular, the process of FIG. 5 is an extension of step S6 of FIG. 4, particularly when it is determined in step S6 that it is not possible to connect the device using a short range wireless connection.

Step S6 is shown in FIG. 5. In the event that it is possible to connect the device requesting to be connected via a short range wireless connection, such as Bluetooth, then the connection will be set-up using this resource. This principle is the same as that described in respect of the embodiment of FIG. 4. However, in the event that it is not possible to connect the device via the short range wireless connection then step S7 takes place.

Step S7 involves determining whether any devices that are currently in a communication session through the WLAN are able to be redirected or rerouted via a short range wireless connection. In order to carry this out, the internal network controller 103c has to consider the location of each of the devices in addition to the locations of each fixed device which is capable of providing such an alternative network resource. This information may be quickly accessible from a device location database.

If the internal network controller 103c determines that there is a device capable of being routed through an alternative network resource, such as via a short range wireless connection, then this device is rerouted via this alternative network resource.

In practice the rerouting of a current communication should not affect the quality of service received by the device. In particular, handover should be seamless to the user of the device.

The rerouting of this device should then free up the saturated WLAN and provide some additional bandwidth to allow the new device to connect via the WLAN. Hence, the device that has requested the communication set-up can be set-up via the WLAN.

In certain embodiments, checks could be carried out in order to determine whether the rerouting is capable of providing a sufficient bandwidth reduction in the WLAN for the WLAN to support the new communication. In order to carry out such checks, the internal network controller 103c will need to take into account information relating to the data bit rates of the new communication and old communication, in addition to any other information relevant to the bandwidth usage of the WLAN.

It may be that the internal network controller 103c determines that there is more than one device capable of being rerouted via an alternative network resource such as a short range wireless connection. In such a case the internal network controller 103c will have to make a determination as to which device should be rerouted.

In making this determination the internal network controller 103c will need to consider the bandwidth requirements of each of the devices capable of being rerouted and the requirements of the device requesting the connection. In particular, it will be most beneficial to re-route the device that reduces the load on the WLAN the most. This will therefore allow for improved connectivity for all users of the WLAN.

In addition to determining the bandwidth requirements, the internal network controller 103c can determine the type of communication to be rerouted. For example, it will be much simpler to reroute a non-streaming communication than rerouting a streaming multimedia type communication. Hence, if a plurality of devices are capable of being rerouted, the internal network controller 103c will determine which will be simpler to reroute.

The internal network controller 103c may also take into account information relating to the type of device. For example, once in use, a laptop computer is much more likely to be used in one position within a home. In contrast a mobile phone could be moved around in use. It therefore makes most sense to attempt to reroute a laptop than a mobile phone, if it is possible to reroute both. Hence, in a further embodiment, the internal network controller 103c takes this information into account when deciding how to perform a rerouting function.

In the event that it is determined that there are not any devices already communicating that could be rerouted then step S4 takes place and the device is routed through the WLAN. As discussed previously in respect of step S4, this will in turn reduce the quality of service provided to users of devices communicating through the WLAN. However, in such circumstances; routing through the WLAN is the only option other than not providing a connection in response to the connection request, i.e. sending a "network busy" message to the device.

In yet another alternative embodiment, the system is arranged to determine a preferred network resource for each new communication request. For example, if a communication request comes from a laptop device in a room having a short range wireless communication capability, then the communication will be set-up through this link, rather than automatically using the WLAN. The WLAN can then be used by devices that are not capable of using any other network resources, or in the event that, for example, the alternative network resource, such as routing via a television and short-range wireless link or the like, is currently unavailable. Such load-balancing should help to prevent the likelihood of a particular network resource becoming overloaded.

The principles of each of the alternative embodiments could clearly be combined in order to provide an optimised network resource allocation system.

While FIGS. 1 and 2 are depicted as showing only a television, mobile phones, a desktop computer, and laptop computers connected to the network it will be appreciated that any suitable electronic device could connect to the network. For example, printers, scanners, MFPs, PDAs, set-top boxes, DVD players, electronic storage devices, music systems, general multimedia/entertainment systems, ovens, boilers, alarm systems, and integrated home lighting systems could all be connected via this network. Furthermore, the above embodiments may describe some of these electronic devices connecting to the gateway through certain network resources. However, it will be appreciated that any device could connect in various alternative ways.

In addition to the above, it will be appreciated that while above only wired network resources, wired network resources combined with short range wireless network resources, and WLAN-based network resources are described it will be appreciated that other network resources could be utilised in accordance with embodiments envisaged by the reader. For example, femto cell based communications could be utilised as previously discussed.

While the above described embodiments refer to the WLAN as being the preferred communication means, in alternative embodiments other network resources may form the preferred means of communication. For example, use of a femto cell which allows free local wireless networking could also be used, and could be the preferred network communication. However, it will be appreciated that any suitable network resource could be utilised.

Embodiments can be implemented in dedicated hardware, using a programmable digital controller suitably programmed, or using a combination of hardware and software.

Alternatively, embodiments can be implemented by software or programmable computing apparatus. This includes any computer, or such like. The code for each process in the methods according to the invention may be modular, or may be arranged in an alternative way to perform the same function.

Each of the functionalities described above can in whole, or in part, be implemented by the combination of a processor and associated memory, or by a standard computer system.

Furthermore, functions described herein as being implemented as part of a single unit may be provided separately, communicatively coupled across a network.

Embodiments described herein, therefore, encompass a carrier medium carrying machine readable instructions or computer code for controlling a programmable controller, computer or number of computers as the apparatus of an embodiment. The carrier medium can comprise any storage medium such as a floppy disk, CD ROM, DVD ROM, hard disk, magnetic tape, flash memory device or programmable memory device, or a transient medium such as an electrical, optical, microwave, RF, electromagnetic, magnetic or acoustical signal. An example of such a signal is an encoded signal carrying a computer code over a communications network, e.g. a TCP/IP signal carrying computer code over an IP network such as the Internet, or an intranet, or a local area network.

Whilst certain embodiments have been described, these embodiments have been presented by way of example only, and are not intended to limit the scope of the inventions. Indeed, the novel devices, methods and products described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method for optimizing a communications network, said network being connected to a further communication network via a gateway and comprising a plurality of heterogeneous network resources and a network controller for routing communications passing through the gateway via one of said network resources, the method being implemented by the network controller and comprising:

receiving a communication request from a device for setting up a communication with the further network, said request identifying a preferred network resource among the plurality of network resources for setting up the communication, or determining by the network controller a preferred network resource for use by the device for setting up the communication;

identifying one or more of at least one communication characteristic of the requested communication and at least one communication characteristic associated with the plurality of network resources;

determining whether the preferred network resource is capable of setting up the requested communication based on said at least one communication characteristic, and if so, establishing the requested communication through the preferred network resource, and if not, the method further comprises:

identifying a physical location of the device requesting the communication;

determining whether the device has a short-range communication capability, and if so, identifying an alternative network resource having a same short-range communication capability and being sufficiently close to said physical location; and establishing the requested communication via said alternative network resource using the short-range communication capability;

wherein, if it is determined that the device requesting the communication does not have a short-range communication capability, if an alternative network resource having a common short-range communication capability with the device is not identified, or if the alternative resource is not sufficiently close to the device requesting the communication, then the method further comprises:
identifying one or more existing communication sessions through the preferred network resource that are redirectable using a short-range communication, and redirecting such existing sessions via one or more alternative network resources having the short-range communication capability;
determining whether the preferred network resource is now capable of setting up the requested communication; and
establishing the requested communication via the preferred network resource.

2. The method according to claim 1,
wherein, if it is determined that the device does not have a short-range communication capability, if an alternative network resource having a common short-range communication capability with the device is not identified, or if the alternative resource is not sufficiently close to the device requesting the communication, then the method further comprises:
establishing the requested communication via the preferred network resource, the communication being based on the at least one communication characteristic.

3. The method according to claim 1, wherein setting up the communication through the alternative network resource involves providing the communication through a wired network resource to a further device, and a short range wireless link between the further device and the device.

4. The method according to claim 1, wherein the at least one communication characteristic comprises a communication characteristic associated with the device.

5. The method according to claim 4, wherein the information relating to the communication characteristic associated with the device includes an identification of the type of communications session to be set up.

6. The method according to claim 5, wherein the information identifying the type of communication session to be set up includes information relating to bandwidth requirements of the type of communications session.

7. The method according to claim 6, wherein the information identifying the type of communication session to be set up includes information relating to minimum delay requirements of the type of communications session.

8. The method according to claim 1, wherein the at least one communication characteristic comprises a bandwidth usage of at least one of the plurality of network resources.

9. The method according to claim 1, wherein said determining whether the preferred network resource is capable of setting up the requested communication based on said at least one communication characteristic is based on at least one of an available bandwidth amount associated with the preferred network resource and information regarding one or more sessions currently in progress that are associated with the preferred network resource.

10. An apparatus for optimizing a communications network, said network being connected to a further communication network via a gateway and comprising a plurality of heterogeneous network resources and a network controller for routing communications passing through the gateway via one of said network resources, the apparatus comprising:
an input arranged to receive a communication request from a device for setting up a communication with the further network, said request identifying a preferred network resource among the plurality of network resources for setting up the communication, or the apparatus being configured to determine a preferred network resource for use by the device for setting up the communication; and
a network controller having a processor arranged to:
identify one or more of at least one communication characteristic of the requested communication and at least one communication characteristic associated with the plurality of network resources;
determine whether the preferred network resource is capable of setting up the requested communication based on said at least one communication characteristic, and if so, establish the requested communication through the preferred network resource, and if not, the processor is further arranged to:
identify a physical location of the device requesting the communication;
determine whether the device has a short-range communication capability, and if so, identify an alternative network resource having a same short-range communication capability and being sufficiently close to the physical location; and
establish the requested communication via said alternative network resource using the short-range communication capability,
wherein, if it is determined by the network controller that the device requesting the communication does not have a short-range communication capability, if an alternative network resource having a common short-range communication capability with the device is not identified, or if the alternative resource is not sufficiently close to the device requesting the communication, then the processor is further arranged to:
identify one or more existing communication sessions through the preferred network resource that are redirectable using a short-range communication, and redirect such existing sessions via one or more alternative network resources having the short-range communication capability;
determine whether the preferred network resource is now capable of setting up the requested communication; and
establish the requested communication via the preferred network resource.

11. The apparatus according to claim 10,
wherein, if it is determined by the network controller that the device requesting the communication does not have a short-range communication capability, if an alternative network resource having a common short-range communication capability with the device is not identified, or if the alternative resource is not sufficiently close to the device requesting the communication, then the processor is further arranged to:
establish the requested communication via the preferred network resource, the communication being based on the at least one communication characteristic.

12. The apparatus according to claim 10, wherein the processor is arranged to set up the communication through the alternative network resource by providing the communication through a wired network resource to a further device, and a short range wireless link between the further device and the device.

13. The apparatus according to any of claim 10, 11, or 12,
wherein the at least one communication characteristic comprises a communication characteristic associated with the device including one or more of:
information relating to bandwidth requirements of the type of communications session to be set-up; and information relating to minimum delay requirements of the type of communications session to be set-up.

14. A computer-usable, non-transitory storage memory carrying computer readable code for controlling a suitable computer, that when executed by the computer, causes the computer to carry out the method of claim 1.

* * * * *